US009123106B2

(12) United States Patent
Homme et al.

(10) Patent No.: US 9,123,106 B2
(45) Date of Patent: Sep. 1, 2015

(54) WATERMARKING SCREEN CAPTURE CONTENT (71) Applicant: Microsoft Corporation, Redmond, WA (US)

(72) Inventors: Jeffrey M. Homme, Redmond, WA (US); Mariusz H. Jakubowski, Bellevue, WA (US); Mohamed Sadek, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 13/713,994

(22) Filed: Dec. 13, 2012

(65) Prior Publication Data

US 2014/0169616 A1 Jun. 19, 2014

(51) Int. Cl.
*G06K 9/00* (2006.01)
*G06T 1/00* (2006.01)
*G06F 21/16* (2013.01)
*G06F 21/74* (2013.01)

(52) U.S. Cl.
CPC .............. *G06T 1/0021* (2013.01); *G06F 21/16* (2013.01); *G06F 21/74* (2013.01)

(58) Field of Classification Search
USPC ......... 382/100, 209, 219; 340/5.8, 5.81, 5.86; 713/176, 179
See application file for complete search history.

(56) References Cited

U.S. PATENT DOCUMENTS

| | | | |
|---|---|---|---|
| 6,408,330 B1 * | 6/2002 | DeLaHuerga | 709/217 |
| 6,507,861 B1 * | 1/2003 | Nelson et al. | 718/104 |
| 6,542,919 B1 * | 4/2003 | Wendorf et al. | 718/100 |
| 6,779,024 B2 * | 8/2004 | DeLaHuerga | 709/217 |
| 6,976,163 B1 * | 12/2005 | Hind et al. | 713/156 |
| 7,020,775 B2 | 3/2006 | Mihcak et al. | |
| 7,069,452 B1 * | 6/2006 | Hind et al. | 713/1 |
| 7,095,873 B2 | 8/2006 | Venkatesan et al. | |
| 7,383,438 B2 * | 6/2008 | Fahrny et al. | 713/169 |
| 7,933,410 B2 * | 4/2011 | Fahrny | 380/201 |
| 7,941,534 B2 * | 5/2011 | De la Huerga | 709/225 |
| 8,055,913 B2 * | 11/2011 | Ginter et al. | 713/194 |
| 8,094,949 B1 * | 1/2012 | Rhoads | 382/232 |
| 8,332,646 B1 * | 12/2012 | Staley et al. | 713/176 |
| 8,521,217 B2 * | 8/2013 | Rodriguez | 455/550.1 |
| 8,612,763 B1 * | 12/2013 | Axel et al. | 713/176 |

(Continued)

OTHER PUBLICATIONS

Justin, "Blizzard watermarking WoW screenshots", Retrieved at <<http://www.boston2phx.com/2012/09/12/blizzard-watermarking-wow-screenshots/>>, Sep. 12, 2012, pp. 2.

Khan, et al., "Entropy Based Data Hiding in Binary Document Images", Retrieved at <<http://www.ijcee.org/papers/369-E937.pdf>>, International Journal of Computer and Electrical Engineering, vol. 3, No. 4, Aug. 2011, pp. 4.

(Continued)

*Primary Examiner* — Yosef Kassa
(74) *Attorney, Agent, or Firm* — Timothy Churna; Kate Drakos; Micky Minhas (57) ABSTRACT

Information is displayed on a device by writing data to a buffer in memory, the content of the buffer describing a screen display of the device at a particular point in time. A watermarked version of the buffer content is generated by watermarking the content of the buffer with data, such as data identifying a user of the device and/or a copy of a program (e.g., an operating system) running on the device. The watermarked version of the buffer content is then made available, such as in response to a screen capture request. The data embedded in the watermarked version of the content is undetectable (or nearly undetectable) to the human eye, but can nonetheless be extracted by other computing devices or data extraction systems.

31 Claims, 7 Drawing Sheets

(56) References Cited

U.S. PATENT DOCUMENTS

| | | | |
|---|---|---|---|
| 8,639,625 B1* | 1/2014 | Ginter et al. | 705/51 |
| 8,824,859 B2* | 9/2014 | Geyzel et al. | 386/260 |
| 8,908,905 B2* | 12/2014 | Hwang et al. | 382/100 |
| 2009/0083710 A1 | 3/2009 | Best et al. | |
| 2011/0314550 A1 | 12/2011 | Mastrangelo et al. | |
| 2012/0174232 A1 | 7/2012 | Dharawat et al. | |
| 2012/0192248 A1 | 7/2012 | Kocjan et al. | |
| 2013/0067238 A1 | 3/2013 | Homme et al. | |

OTHER PUBLICATIONS

Fotopoulos, et al., "Bit Signature casting in the DCT domain", Retrieved at <<http://www.upatras.gr/ieee/skodras/pubs/ans-e12.pdf>>, Oct. 2000, pp. 11.

Craver, et al., "Reading between the Lines: Lessons from the SDMI Challenge", Retrieved at <<http://static.usenix.org/events/sec01/craver.pdf>>, Proceedings of the 10th USENIX Security Symposium, Aug. 13, 2001, pp. 12.

* cited by examiner

WATERMARKING SCREEN CAPTURE CONTENT

BACKGROUND

As computing technology has advanced, computer programs have become increasingly complex, resulting in programs that take a large amount of time to build and test. This increased complexity has resulted in programs that provide significant functionality and usability, but the development of these programs is not without its problems. One such problem is that a large number of people can be involved in the development of these programs, including people employed by the program developer as well as third parties. While these people are typically required to keep information about these programs confidential, information about these programs can sometimes be intentionally or inadvertently released. When such information is released, it is desirable to know who released the information so that appropriate remedial action can be taken (e.g., in order to prevent future releases). Unfortunately, when information regarding a program is released, it is oftentimes difficult to determine who released the information, making it difficult to take any remedial action.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a content of a graphics buffer of a computing device is obtained. This content of the graphics buffer describes a screen display at a particular time. The content of the graphics buffer is watermarked with data identifying one or both of a user of the computing device and a copy of a program running on the computing device, and the watermarked content of the graphics buffer is stored or otherwise made available (e.g., in response to a screen capture request).

BRIEF DESCRIPTION OF THE DRAWINGS

The same numbers are used throughout the drawings to reference like features.

DETAILED DESCRIPTION

Watermarking screen capture content is discussed herein. Information is displayed on a device by writing data to a buffer in memory, the content of the buffer describing a screen display of the device at a particular point in time. The content of the buffer is updated as the information to be displayed changes, and the device updates the screen display based on the content of the buffer at a particular interval (e.g., 30 times per second). A watermarked version of the buffer content is generated by watermarking the content of the buffer with various data, such as data identifying a copy of a program (e.g., an operating system) running on the device and/or a user of the device. The watermarked version of the buffer content is then made available, such as in response to a screen capture request. The data embedded in the watermarked version of the content is undetectable (or nearly undetectable) to the human eye, but can nonetheless be extracted by other computing devices or data extraction systems.

Figure 1:
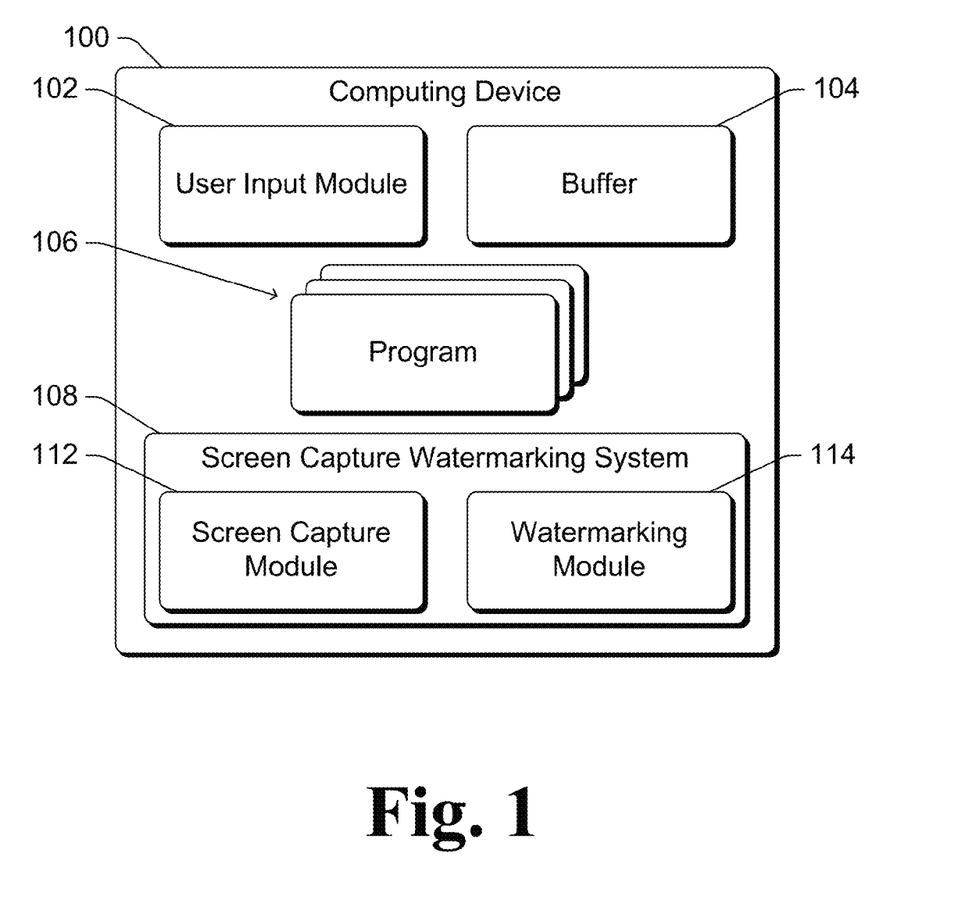
FIG. 1 is a block diagram illustrating an example computing device implementing the watermarking screen capture content in accordance with one or more embodiments.

FIG. 1 is a block diagram illustrating an example computing device 100 implementing the watermarking screen capture content in accordance with one or more embodiments. Computing device 100 can be a variety of different types of devices, such as a physical device or a virtual device. For example, computing device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 100 can also be a virtual device, such as a virtual machine running on a physical device. A virtual machine can be run on any of a variety of different types of physical devices (e.g., any of the various types listed above). Thus, computing device 100 may range from full resource devices with substantial memory and processor resources (e.g., personal computers, game consoles) to low-resource devices with limited memory and/or processing resources (e.g., traditional set-top boxes, handheld game consoles).

Computing device 100 includes a user input module 102, a buffer 104, one or more programs 106, and a screen capture watermarking system 108. User input module 102 receives user inputs from a user of computing device 100. User inputs can be provided in a variety of different manners, such as by pressing one or more keys of a keypad or keyboard of device 100, pressing one or more keys of a controller (e.g., remote control device, mouse, track pad, etc.) of device 100, pressing a particular portion of a touchpad or touchscreen of device 100, making a particular gesture on a touchpad or touchscreen of device 100, and/or making a particular gesture on a controller (e.g., remote control device, mouse, track pad, etc.) of device 100. User inputs can also be provided via other physical feedback input to device 100, such as tapping any portion of device 100, an action that can be recognized by a motion detection or other component of device 100 (such as shaking device 100, rotating device 100, bending or flexing device 100, etc.), and so forth. User inputs can also be provided in other manners, such as via voice or other audible inputs to a microphone, via motions of hands or other body parts observed by an image capture device, and so forth.

Programs 106 are various software and/or firmware programs that can be run on computing device 100. Each program 106 can be any set of instructions that can be executed, installed, interpreted, or otherwise run on computing device 100. Programs 106 can include programs installed on computing device 100, programs copied to and run on computing device 100 without installation, script programs run on computing device 100, and so forth. Programs 106 can include an operating system of device 100 and/or other applications run by an operating system or other application of device 100.

Buffer 104 is memory the content of which describes a screen display that is to be displayed by the device (e.g., on a screen of the device) at a particular time. Buffer 104 is also referred to as graphics memory or a graphics buffer, and can be changed at various intervals to reflect changes in the information to be displayed. One or more programs 106 can alter the data stored in buffer 104 at various times to reflect the information that the one or more programs 106 desire to have displayed to a user of computing device 100. The data in buffer 104 is used by a graphics system (e.g., of computing device 100) to generate a screen display for device 100, which is the image or information displayed by device 100. The graphics system can generate a screen display at various intervals (e.g., 30 times per second, in response to a change in the data in buffer 104, and so forth). Computing device 100 can include one or more components (e.g., displays, projectors, etc.) on which data is displayed by device 100, or alternatively device 100 can generate one or more signals that are output to other devices or components (e.g., other devices including displays, projectors, etc.) that are separate from computing device 100.

In one or more embodiments, buffer 104 can be a screen buffer. Programs 106 write, to the screen buffer, the data describing the information that the programs 106 desire to have displayed to a user of computing device 100. A graphics system (which may be included at least in part in an operating system of computing device 100, which can be a program 106) generates information to include in a frame buffer based on the content of the screen buffer. The frame buffer identifies color values for every pixel of a display, and the graphics system uses the frame buffer to generate the screen display at a particular point in time. Alternatively, buffer 104 can be other buffers in computing device 100. For example, buffer 104 can be a frame buffer.

Screen capture watermarking system 108 includes a screen capture module 112 and a watermarking module 114. Although screen capture watermarking system 108 is illustrated as separate from program 106, at least part of system 108 can alternatively be included as part of a program 106 (e.g., be included as part of an operating system of device 100).

Screen capture module 112 manages screen capture functionality of device 100. In response to a screen capture request, screen capture module 112 obtains the content of buffer 104. The obtaining the content of buffer 104 is also referred to as a screen capture. A screen capture request is a request for an image of the current screen display (typically the screen display when the request is received). Any of a variety of user inputs as discussed above can be used to input a screen capture request, such as pressing a "print screen" key of a keyboard, selecting a particular hot key sequence, selecting a menu item, entering a particular gesture on a touchscreen, providing a voice command, and so forth. The content of buffer 104 is the data stored in buffer 104.

Watermarking module 114 manages watermarking functionality of device 100. Watermarking as used herein refers to embedding data in an image by altering the image in a manner that is undetectable (or almost undetectable) visually to a user. A watermarked (altered) version of an original image is generated by watermarking module 114 that is indistinguishable (or almost indistinguishable) from the original image to the human eye. Thus, a user looking at the watermarked and original versions of the image sees very little, if any, difference between the two versions of the image. Although a user may not be able to discern any difference between the two versions of the image, a data extraction system can analyze the watermarked version of the image and readily extract the data embedded in the watermarked version.

Programs 106 are typically pre-release or test versions of programs that are to be kept confidential. This confidential nature of programs 106, as well as the fact that programs 106 may be tracked, is made known to users prior to obtaining and/or running the programs. The programs 106 are obtained and/or run by computing device 100 only after receiving user acknowledgment of this confidential nature of the programs 106 and only after receiving user consent to track programs 106. For example, the user may take an affirmative action acknowledging the confidential nature of programs 106 and requesting that the tracking of programs 106 be performed before programs 106 are obtained and/or run by computing device 100. After programs 106 are no longer pre-release or test versions of programs, system 108 ceases performing the screen capture watermarking discussed herein for programs 106.

Figure 2:
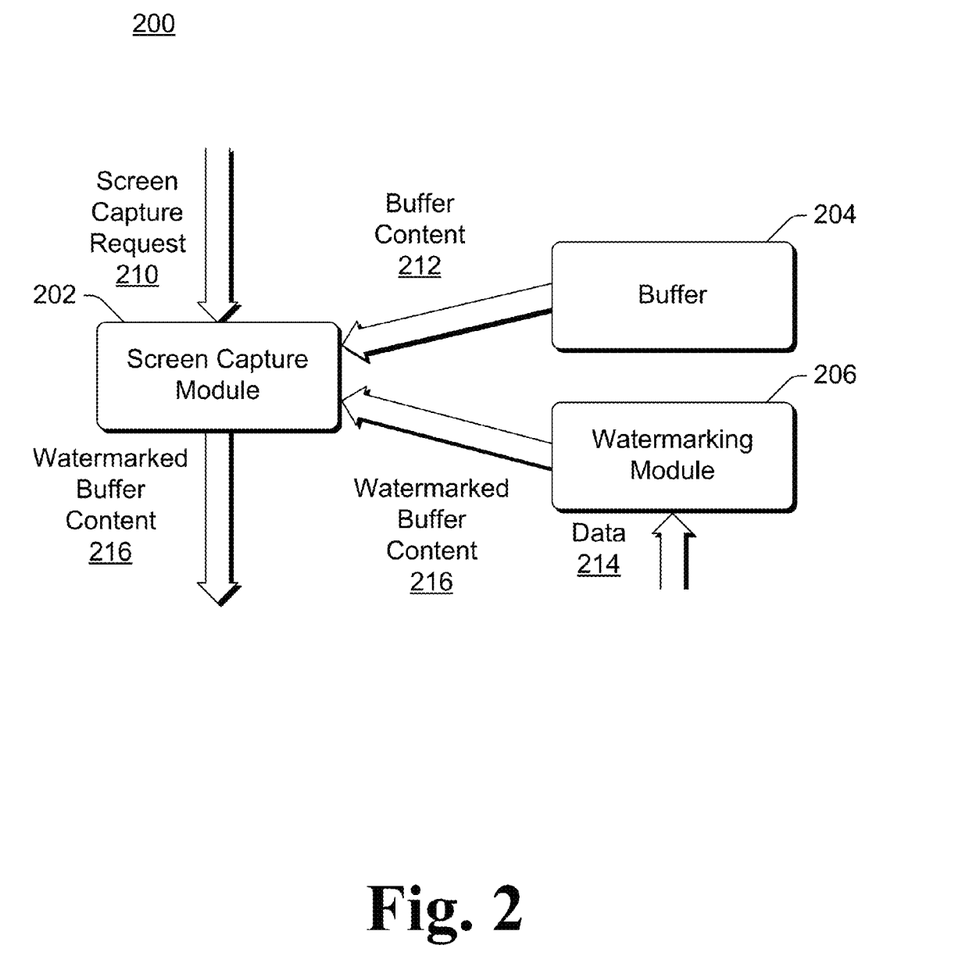
FIG. 2 illustrates an example screen capture watermarking system in accordance with one or more embodiments.

FIG. 2 illustrates an example screen capture watermarking system 200 in accordance with one or more embodiments. System 200 can be, for example, a screen capture watermarking system 108 of FIG. 1. System 200 includes a screen capture module 202 (which can be a screen capture module 112 of FIG. 1), a buffer 204 (which can be a buffer 104 of FIG. 1), and a watermarking module 206 (which can be a watermarking module 114 of FIG. 1).

Screen capture module 202 receives or is otherwise notified of a screen capture request 210. Screen capture request 210 can be received via any of a variety of user inputs, as discussed above. In response to screen capture request 210, screen capture module 202 obtains the buffer content 212 from buffer 204. Module 202 can obtain the buffer content 212 in various manners, such as copying the content from a location known to be buffer 204, invoking an application programming interface (API) or other mechanism supported by the graphics system for obtaining data from buffer 204, and so forth. Module 202 provides the obtained buffer content 212 to watermarking module 206. The obtained buffer content 212 provided to watermarking module 206 is data describing an image (an image of the screen display), which is typically an indication of the color values for every pixel of the image. Depending on the manner in which buffer 204 is implemented, module 202 optionally converts the data in buffer 204 into a format that includes an indication of the color values for every pixel of the image. As buffer content 212 includes an indication of the color values for every pixel of the image, buffer content 212 can also be referred to as an image.

Alternatively, rather than obtaining buffer content 212 from buffer 204, module 202 can send a request or otherwise inform buffer 204 to provide buffer content 212 to watermarking module 206, or module 202 can send a request or other information to watermarking module 206 causing module 206 to obtain buffer content 212 from buffer 204. In such embodiments, depending on the manner in which buffer 204 is implemented, watermarking module 206 optionally converts the data in buffer 204 into a format that includes an indication of the color values for every pixel of the image.

Regardless of how watermarking module 206 obtains buffer content 212, module 206 obtains data 214 to embed in buffer content 212. In one or more embodiments, data 214 includes data identifying a copy of a program running on the device implementing system 200 (e.g., a program 106 of FIG. 1). Data 214 may additionally, or alternatively, include information about the user of the device implementing system 200. Watermarking module 206 can obtain data 214 from a data store that can be implemented in various manners, such as a registration data store (e.g., an operating system registry, a database, or other information store), a secure memory location (e.g., that can be read from but not written to except by a secure or trusted processor or module), and so forth. Alternatively, rather than obtaining data 214 from a data store, watermarking module 206 can retrieve data 214 from the program, can generate data 214 (e.g., based on the instructions of the program, based on data returned from the program in response to a request from module 206, and so forth), can retrieve data 214 from elsewhere (e.g., another module or component of system 200), and so forth.

Data 214 can include various information. In one or more embodiments, different copies of programs have different identifiers. A copy of a program refers to the code (e.g., instructions, binaries, configuration data, etc.) of the program obtained by a particular user or other entity. For example, a program may be an operating system and multiple users may download or otherwise obtain a copy of the same operating system—although the operating system itself can be the same for all of the users that obtained a copy of the operating system, each user obtained their own copy of the operating system. Data 214 includes an identifier that identifies a particular copy of the program. For example, when a program is obtained by the device implementing system 200, an identifier of the obtained copy of the program is also obtained. The identifier of the copy of the program is associated with that copy of the program (e.g., included in the copy of the program), and is moved with the program if the program were to be moved (e.g., copied or otherwise transferred) to other devices. Thus, the data identifies the copy of the program regardless of what computing device is running the program.

Data 214 can alternatively or additionally include the identity of a user of the device implementing system 200. This user of the device can identify, for example, a current user of the device and/or a user that obtained the copy of the program on the device. The user of the device can be an individual or other entity, such as a company, a division of a company, another group, and so forth. Data 214 can alternatively or additionally include other information, such as an identifier of the device implementing system 200, identifiers of other programs running on the device implementing system 200, various characteristics of the device implementing system 200 (e.g., an Internet protocol (IP) address, a media access control (MAC) address, etc.), and so forth. The data 214 is also discussed in more detail below.

In one or more embodiments, a program (e.g., program 106 of FIG. 1) is an operating system of the computing device that implements system 200, and data 214 is an identifier of a particular copy of the operating system. Other programs may be run at the same time as the operating system, but data 214 includes an identifier of the copy of the operating system rather than any of the other programs.

Alternatively, one or more programs (e.g., programs 106 of FIG. 1) can be other programs run by an operating system of the computing device that implements system 200, and data 214 is an identifier of particular copies of those one or more programs. The one or more programs for which identifiers are to be included in data 214 can be determined in various manners, such as being programs identified by a user of system 200, programs identified by another component or module, a currently active program, a program for which a window is currently being displayed, a program for which a window currently being displayed is a top-level window, and so forth.

Watermarking module 206 embeds data 214 in the obtained buffer content. The embedded data is very difficult for a user to detect visually, but can be extracted by an extraction system that is aware of the technique used to embed the watermark. This technique can include various aspects (such as secret keys and/or methods) that make it very difficult to extract the embedded data without knowledge of these aspects. Thus, if a user were aware that data is embedded in the buffer content (e.g., due to their consent to have the program tracked as discussed above), the user is prevented from extracting the embedded data if the user does not have knowledge of these various aspects because of the difficulty such extraction would entail.

Generally, watermarking module 206 embeds data 214 in the obtained buffer content by making alterations or changes to the obtained buffer content. These alterations or changes are also referred to as the watermark. Watermarking module 206 can embed data 214 in various manners, such as by using statistics quantization to alter various different statistics regarding the data in the obtained screen buffer content. The embedding of data 214 in the buffer content is discussed in more detail below.

The buffer content altered to embed data 214 is referred to as the watermarked buffer content 216, which is returned to screen capture module 202. Module 202 makes watermarked buffer content 216 available in response to screen capture request 210. Watermarked buffer content 216 can be made available in various manners, such as by storing content 216 in a particular location where screen capture content is expected (e.g., a clipboard), returning content 216 as a return value in response to request 210, storing content 216 in a data store (e.g., a database), and so forth.

It should be noted that, although the user can be notified that a program is being tracked and consent to such tracking as discussed above, the user need not be aware of what data is being embedded in the buffer content, how the data is being embedded in the buffer content, and/or whether watermarked buffer content is being generated. The watermarked buffer content is visually indistinguishable (or almost indistinguishable) from the buffer content, making it very difficult for a user to detect the presence of the watermark.

Figure 3:
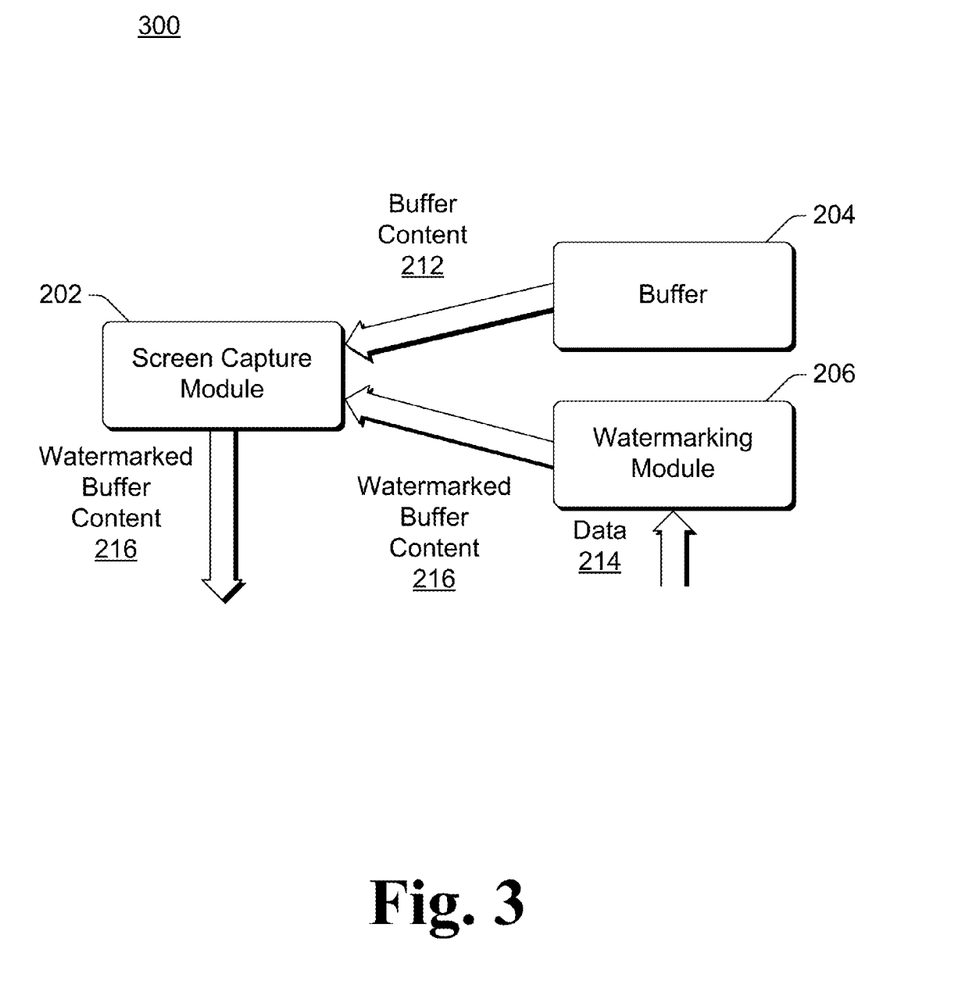
FIG. 3 illustrates another example screen capture watermarking system in accordance with one or more embodiments.

FIG. 3 illustrates another example screen capture watermarking system 300 in accordance with one or more embodiments. System 300 can be, for example, a screen capture watermarking system 108 of FIG. 1. System 300 is analogous to screen capture watermarking system 200 of FIG. 2, and includes a screen capture module 202, a buffer 204, and a watermarking module 206. Buffer content 212 is obtained by screen capture module 202, data 214 is obtained by watermarking module 206, and watermarked buffer content 216 is obtained by screen capture module 202.

System 300 differs from system 200 of FIG. 2 in that in system 300 a screen capture request 210 is not received by screen capture module 202. Rather, screen capture module 202 obtains buffer content 212 in response to various other criteria being satisfied. This criteria can be, for example, an elapsed amount of time since a watermarked version of buffer content was last generated (e.g., so that watermarked buffer content is generated at various intervals, such as every 10 milliseconds, every 100 milliseconds, etc.), a change in the screen display (e.g., so that a watermarked version of buffer content is generated for each screen display), a request from another device or module to generate a watermarked version of buffer content, and so forth.

Once the criteria being used by screen capture module 202 are satisfied, buffer content 212 is obtained and watermarked buffer content 216 is generated as discussed above with respect to screen capture watermarking system 200 of FIG. 2. Watermarked buffer content 216 is made available by module 202 in various manners, such as by storing content 216 in a particular location where screen capture content is expected (e.g., a clipboard), returning content 216 as a return value in response to a request received by module 202 for watermarked buffer content, storing content 216 in a data store (e.g., a database), storing content 216 in buffer 204, and so forth.

In the discussions herein, data is discussed as being embedded in buffer content. The embedded data can include various information, and typically includes one or both of data identifying a user of the device implementing the screen capture watermarking system and data identifying a copy of a program on the device implementing the screen capture watermarking system. Various different identifiers can be used as data identifying a copy of a program on the device. In one or more embodiments, a product key associated with the program is used as the identifier of the program. Each copy of the program has an associated product key that is used to activate the program. To activate a particular copy of the program, the product key associated with the copy is provided to an activation service (typically over a data network, such as the Internet, a local area network, a telephone network, etc.). The activation service verifies that the provided product key is the proper product key for the copy of the program, and activates the copy of the program for running on the device only if the product key is verified. The copy of the program can be restricted in various manners (e.g., not allowed to run, allowed to run only a particular number of times, allowed to run with restricted functionality, and so forth) if the product key is not verified.

In other embodiments, a fingerprint of the copy of the program is used as the identifier of the copy of the program. When the copy of the program is obtained by a computing device from an authorized source (e.g., a server or service that distributes, and that is permitted by the developer of the program to distribute, the program), a fingerprint is included in the copy of the program. The fingerprint can be included, for example, in a known (e.g., predefined) fingerprint location of the copy of the program. The fingerprint is generated by the authorized source, and includes a user portion and/or a program portion. The user portion can be generated by computing the result of a one-way cryptographic function of information identifying a user (e.g., a person, a company, or other entity) that is obtaining the program. By using the one-way cryptographic function, the specific identity of the user cannot be derived from the fingerprint. This information identifying the user can be, for example, information used by the user to log on to the server or service that distributes the program.

The program portion includes information about the program. This information can be, for example, a program name, a program version (e.g., build) number, a timestamp when the program was created and/or obtained, combinations thereof, and so forth. The fingerprint can optionally be signed, such as using a private key of a public/private key pair of the authorized source. This signature can be subsequently verified using the public key of the public/private key pair, and relied upon as an identifier of the program only if the signature is subsequently verified.

In the discussions here, data is discussed as being embedded in the buffer content using watermarking. Although various different watermarking techniques can be used, the watermarking technique used generally has the following characteristics. The watermarking technique results in watermarked buffer content that is undetectable (or nearly undetectable) to the human eye—when an image from the watermarked buffer content is displayed to a user the image of the watermarked buffer content is indistinguishable (or nearly indistinguishable) from an image from the buffer content. The watermarking is thus typically not noticeable to the user.

The watermarking technique also operates quickly, typically generating the watermarked buffer content in less than a threshold amount of time (e.g., less than 33 milliseconds, less than 20 milliseconds, etc.). By generating the watermarked buffer content quickly, the watermarking screen capture content techniques discussed herein do not result in noticeable delay to the user (e.g., there is typically no delay resulting from the watermarking that is noticeable to the user in response to a screen capture request).

The watermarking technique also provides robustness against various compression algorithms. The watermarked buffer content may be subsequently compressed (e.g., in response to a user request or as part of standard image-file encoding), and the watermarking technique is resistant to such compression. By being resistant to such compression, the embedded data is more likely to be detectable after compression of the watermarked buffer content.

The watermarking technique is also a dynamic technique that adjusts based on the content in which the data is being embedded. The data is embedded in portions of the buffer content having higher entropy than other portions, resulting in the data being embedded more quickly, more robustly, and with less likelihood of being visibly detectable due to the higher entropy of the portions in which the data is embedded.

In one or more embodiments, the watermarking is performed based on statistics quantization. Portions (e.g., rectangles, triangles, or other shapes), optionally overlapping, of the buffer content or of a transform thereof are selected. These portions can be selected in various manners, such as pseudo-randomly or according to other rules or criteria. A key used as a seed value for a pseudorandom number generation (which is the basis for pseudorandomly selecting portions) can be maintained as a secret (e.g., by the watermarking module, or another module that provides pseudorandom numbers to the watermarking module).

Statistics regarding the selected portions are generated. Various types of statistics can be generated, such as averages of wavelet coefficients, pixel intensities, and so forth. The statistics for one or more of the selected portions are then adjusted or quantized to be in accordance with a particular pattern (e.g., divisible by a particular number), the particular pattern indicating the value of a bit (e.g., a value of zero or a value of one). By adjusting or quantizing the statistics for multiple portions, multiple bit values can be embedded in the buffer content, and the data (e.g., the different bits of the data) can be embedded in the buffer content. In one or more embodiments, the value of a bit is embedded in a selected portion only if the statistics indicate at least a threshold amount of entropy in the portion (e.g., at least a threshold average pixel intensity value, at least a threshold average wavelet coefficient value, and so forth). A subset of the selected portions can also optionally be selected, the subset being a number (e.g., equal to the number of bits in the data to be embedded) of portions of the selected portions having higher entropy than other portions (e.g., the portions having greater average pixel intensities, the portions having greater average wavelet coefficient values, and so forth).

The watermarked buffer content generated by a screen capture watermarking system can later be analyzed and the data embedded in the watermarked buffer content extracted.

Thus, the copy of a program that was running when the screen capture occurred can be identified after the watermarked buffer content is generated.

Figure 4:
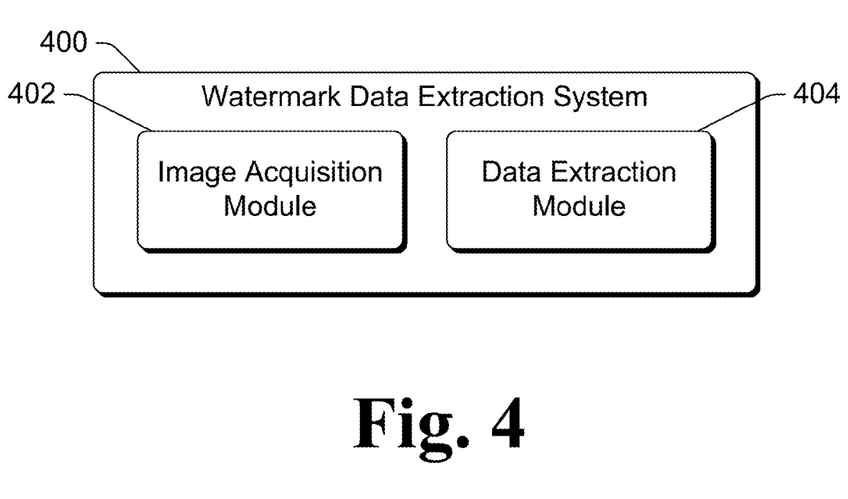
FIG. 4 is a block diagram illustrating an example watermark data extraction system in accordance with one or more embodiments.

FIG. 4 is a block diagram illustrating an example watermark data extraction system 400 in accordance with one or more embodiments. Watermark data extraction system 400 includes an image acquisition module 402 and a data extraction module 404. Image acquisition module 402 receives or otherwise obtains an image from which embedded data is to be extracted. Data extraction module 404 analyzes the obtained image and extracts data embedded in a watermark of the image.

Data extraction module 404 can extract the data embedded in the watermark of the image in a variety of different manners. Data extraction module 404 has knowledge of (e.g., is programmed with or otherwise obtains) how data was embedded in the image (e.g., by watermarking module 206 of FIG. 2 or FIG. 3 discussed above), including knowledge of any keys, methods, and so forth used to embed the data. Given this knowledge of the manner in which data was embedded, data extraction module 404 can readily extract the data embedded in the image. For example, data extraction module 404 can use the same pseudorandom number generator and seed value to select portions of the image as were used by watermarking module 206, and analyze generated statistics (the same type of statistics as were used by watermarking module 206) to readily identify what values (if any) are embedded in the selected portions.

The extracted data can then be used to identify the particular copy of the program that was running when the screen capture was made (e.g., when a screen capture request was received). A record of the user (e.g., a person, a company, or other entity) associated with each copy of the program can be maintained (e.g., by the developer, authorized source of the program, etc.), allowing which user obtained the copy of the program running in the screen capture to be readily identified. By embedding data identifying the particular copy of the program, no record of the device running the program need be maintained. The copy of the program could be run on any device, whether known to the developer (or authorized source) or not, and which user obtained the copy of the program running in the screen capture is still able to be readily identified.

Figure 5:
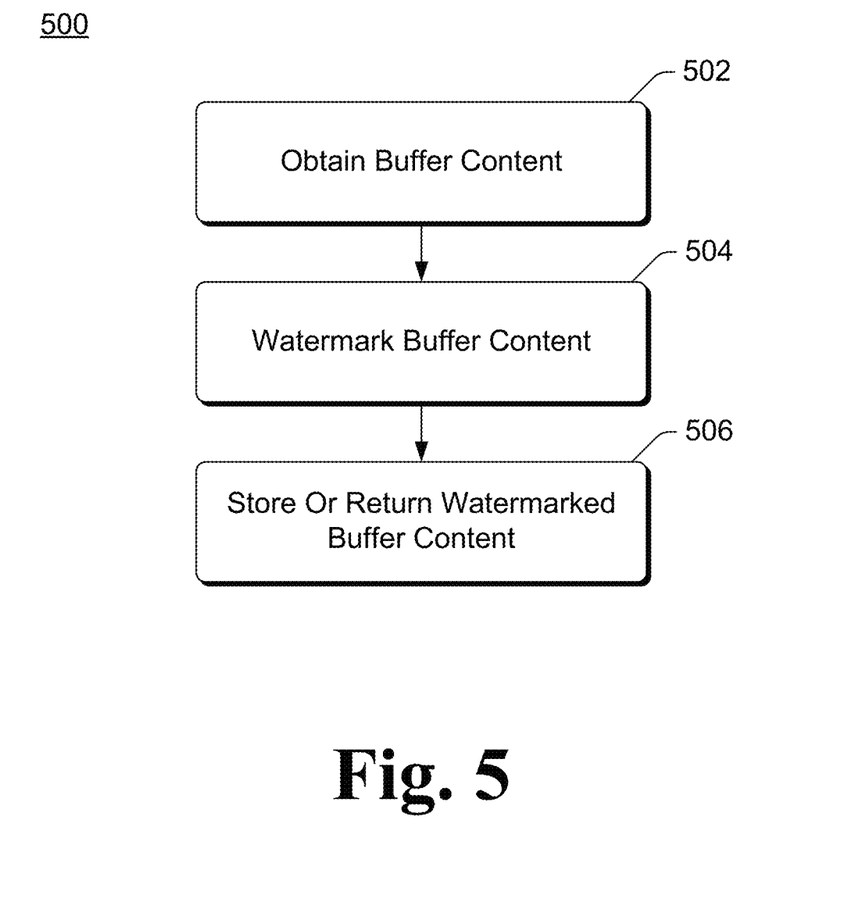
FIG. 5 is a flowchart illustrating an example process for watermarking screen capture content in accordance with one or more embodiments.

FIG. 5 is a flowchart illustrating an example process 500 for watermarking screen capture content in accordance with one or more embodiments. Process 500 is carried out by a screen capture watermarking system, such as system 108 of FIG. 1, system 200 of FIG. 2, or system 300 of FIG. 3, and can be implemented in software, firmware, hardware, or combinations thereof. Process 500 is shown as a set of acts and is not limited to the order shown for performing the operations of the various acts. Process 500 is an example process for watermarking screen capture content; additional discussions of watermarking screen capture content are included herein with reference to different figures.

In process 500, buffer content is obtained (act 502). The buffer content is content that describes a screen display that is to be displayed by a device. The buffer content can be obtained by various modules in different manners, as discussed above.

The buffer content obtained in act 502 is watermarked (act 504). The watermarking can embed various data in the buffer content as discussed above. The watermarked buffer content is a version of the buffer content in which data is such that the data is undetectable (or nearly undetectable) to the human eye, but can nonetheless be extracted by other computing devices or systems.

The watermarked buffer content is stored or returned (act 506). The watermarked buffer content can be returned to a requester that provided a request in response to which the watermarked buffer content was generated, can be stored in a particular location or data store, and so forth as discussed above.

Figure 6:
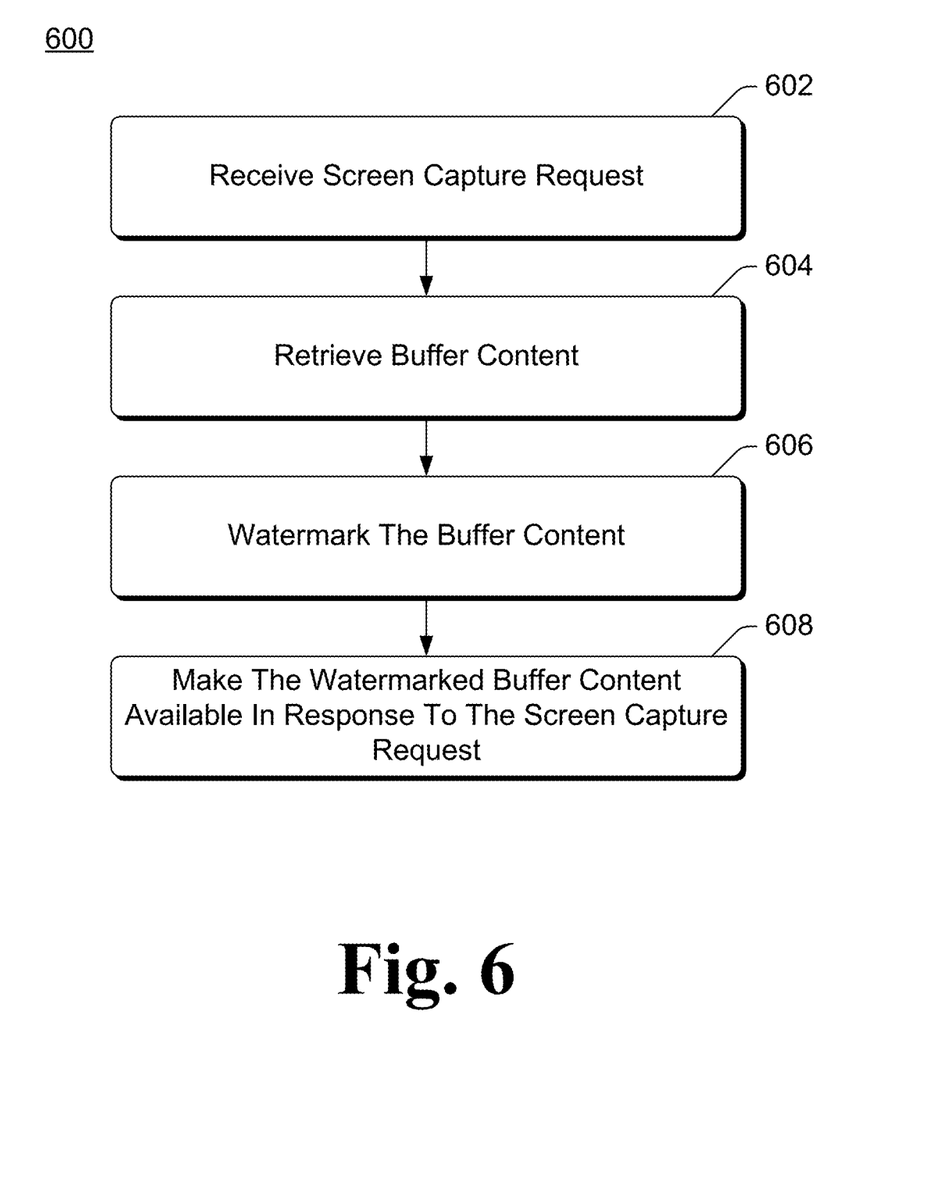
FIG. 6 is a flowchart illustrating another example process for watermarking screen capture content in accordance with one or more embodiments.

FIG. 6 is a flowchart illustrating another example process 600 for watermarking screen capture content in accordance with one or more embodiments. Process 600 is carried out by a screen capture watermarking system, such as system 108 of FIG. 1, system 200 of FIG. 2, or system 300 of FIG. 3, and can be implemented in software, firmware, hardware, or combinations thereof. Process 600 is shown as a set of acts and is not limited to the order shown for performing the operations of the various acts. Process 600 is an example process for watermarking screen capture content; additional discussions of watermarking screen capture content are included herein with reference to different figures.

In process 600, a screen capture request is received (act 602). The screen capture request can be received as various different user inputs, as discussed above.

In response to receiving the screen capture request, buffer content is obtained (act 604). The buffer content is content that describes a screen display that is to be displayed by a device. The buffer content can be obtained by various modules in different manners, as discussed above.

The buffer content obtained in act 604 is watermarked (act 606). The watermarking can embed various data in the buffer content as discussed above. The watermarked buffer content is a version of the buffer content in which data is such that the data is undetectable (or nearly undetectable) to the human eye, but can nonetheless be extracted by other computing devices or systems.

The watermarked buffer content is made available in response to the screen capture request (act 608). The watermarked buffer content can be made available in various manners, as discussed above. In one or more embodiments, the watermarked buffer content is stored in a particular memory location where screen capture data is expected (e.g., by the operating system, by a user, etc.), and this location can vary based on the system implementing process 600 (and/or the device which implements that system), desires of the designer of the system implementing process 600 (and/or the device which implements that system), and so forth. For example, the watermarked buffer content can be stored in a clipboard of an operating system running on the device that implements the system implementing process 600.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Additionally, although particular functionality is discussed herein with reference to particular modules, it should be noted that the functionality of individual modules discussed herein can be separated into multiple modules, and/or at least some functionality of multiple modules can be combined into a single module.

Figure 7:
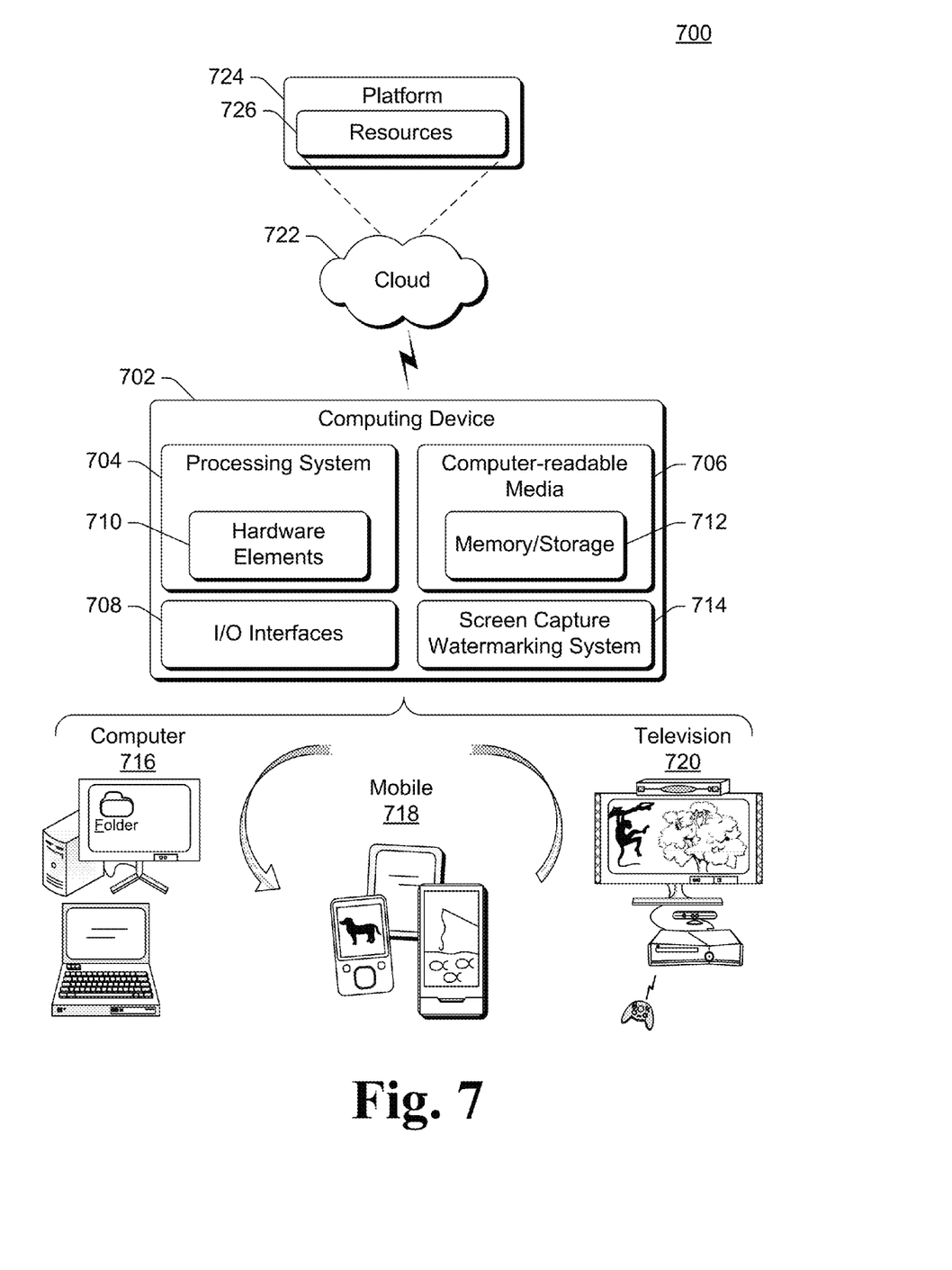
FIG. 7 illustrates an example system that includes an example computing device that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Computing device 702 also includes a screen capture watermarking system 714. Screen capture watermarking system 714 provides various functionality for watermarking buffer content for screen captures, as discussed above. Screen capture watermarking system 714 can implement, for example, screen capture watermarking system 108 of FIG. 1, screen capture watermarking system 200 of FIG. 2, and/or screen capture watermarking system 300 of FIG. 3. Alternatively, rather than screen capture watermarking system 714, computing device 702 can include a watermark data extraction system such as watermark data extraction system 400 of FIG. 4.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on.

The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage media having stored thereon multiple instructions that, when executed by one or more processors of a computing device, cause the one or more processors to:
   obtain content of a graphics buffer of the computing device, the content of the graphics buffer describing a screen display at a particular time;
   watermark the content of the graphics buffer with data identifying a copy of a program running on the computing device; and
   store the watermarked content of the graphics buffer.

2. One or more computer-readable storage media as recited in claim 1, the data comprising data identifying the copy of the program running on the computing device, the program comprising an operating system of the computing device.

3. One or more computer-readable storage media as recited in claim 1, the instructions causing the one or more processors to watermark the content of the graphics buffer comprising instructions causing the one or more processors to alter the content of the graphics buffer in a manner to embed the data so that the data is visually undetectable.

4. One or more computer-readable storage media as recited in claim 1, the data comprising a product key that can activate the copy of the program.

5. One or more computer-readable storage media as recited in claim 1, the instructions causing the one or more processors to watermark the content of the graphics buffer further causing the one or more processors to watermark the content of the graphics buffer with data identifying the computing device.

6. One or more computer-readable storage media as recited in claim 1, the instructions causing the one or more processors to store the watermarked content of the graphics buffer comprising instructions causing the one or more processors to store the watermarked content of the graphics buffer in the graphics buffer.

7. One or more computer-readable storage media as recited in claim 1, the instructions causing the one or more processors to store the watermarked content of the graphics buffer comprising instructions causing the one or more processors to store the watermarked content of the graphics buffer in a memory location where screen capture data is expected.

8. One or more computer-readable storage media as recited in claim 1, the instructions causing the one or more processors to watermark the content of the graphics buffer comprising instructions causing the one or more processors to watermark the graphics buffer content without a user of the computing device being aware of the watermarking.

9. One or more computer-readable storage media as recited in claim 1, the instructions causing the one or more processors to watermark the content of the graphics buffer comprising instructions causing the one or more processors to watermark the graphics buffer content by embedding the data in the graphics buffer content in a manner preventing extracting of the embedded data without knowledge of one or more aspects used to embed the data.

10. One or more computer-readable storage media as recited in claim 1, the instructions causing the one or more processors to watermark the content comprising instructions causing the one or more processors to watermark the graphics buffer content in a dynamic manner based on data in the graphics buffer content by embedding the data identifying the program in portions of the graphics buffer content having higher entropy than other portions of the graphics buffer content.

11. A method comprising:
receiving, at a device, a screen capture request;
retrieving, in response to the screen capture request, content of a graphics buffer of the device, the content of the graphics buffer describing a screen display at a particular time;
watermarking, with data identifying a copy of a program running on the device, the content of the graphics buffer; and
making the watermarked content of the graphics buffer available in response to the screen capture request.

12. A method as recited in claim 11, the data comprising data identifying the copy of the program running on the device, and the program comprising an operating system of the device.

13. A method as recited in claim 11, the watermarking comprising altering the content of the graphics buffer in a manner to embed the data so that the data is visually undetectable.

14. A method as recited in claim 11, the data comprising a product key that can activate the copy of the program.

15. A method as recited in claim 11, the watermarking further comprising watermarking the content of the graphics buffer with data identifying the device.

16. A method as recited in claim 11, the making the watermarked content of the graphics buffer available comprising storing the watermarked content of the graphics buffer in the graphics buffer.

17. A method as recited in claim 11, the making the watermarked content of the graphics buffer available comprising storing the watermarked content of the graphics buffer in a memory location where screen capture data is expected.

18. A method as recited in claim 11, the watermarking comprising watermarking the graphics buffer content by embedding the data in the content of the graphics buffer in a manner preventing extracting of the embedded data without knowledge of one or more aspects used to embed the data.

19. A method as recited in claim 11, the watermarking comprising watermarking the graphics buffer content in a dynamic manner based on data in the graphics buffer content by embedding the data identifying the program in portions of the graphics buffer content having higher entropy than other portions of the graphics buffer content.

20. A device comprising:
a graphics buffer having content describing a screen display of the device at a particular time;
a screen capture module configured to receive a screen capture request, and obtain, in response to the screen capture request, the graphics buffer content from the graphics buffer;
a watermarking module configured to obtain the graphics buffer content from the screen capture module, and watermark the content of the graphics buffer with data by altering the content of the graphics buffer in a manner to embed the data so that the data is visually undetectable, the data identifying a copy of an operating system of the device; and
the screen capture module being further configured to make the watermarked content of the graphics buffer available in response to the screen capture request.

21. A method comprising:
retrieving content of a graphics buffer of a device, the content of the graphics buffer describing a screen display at a particular time;
watermarking, with data identifying a copy of a program running on the device, the content of the graphics buffer; and
making the watermarked content of the graphics buffer available.

22. A method as recited in claim 21, the data being obtained from one or more of a registration data store, a secure memory location, information retrieved from the program, information generated based on instructions of the program, or information returned from the program in response to a request.

23. A method as recited in claim 21, the data comprising a fingerprint of the copy of the program used as the identifier of the copy of the program, the fingerprint including one or both of a user portion and a program portion, wherein the user portion includes information identifying a user and the program portion includes information about the program.

24. A device comprising:
a graphics buffer having content describing a screen display of the device at a particular time;
a screen capture module configured to obtain the graphics buffer content from the graphics buffer;
a watermarking module configured to obtain the graphics buffer content from the screen capture module, and watermark the content of the graphics buffer with data by altering the content of the graphics buffer in a manner to embed the data so that the data is visually undetectable, the data identifying a copy of an operating system of the device; and
the screen capture module being further configured to make the watermarked content of the graphics buffer available.

25. A device as recited in claim 24, the data further comprising a product key that can activate the copy of the operating system.

26. A device as recited in claim 24, the watermarking module being further configured to watermark the graphics buffer content by embedding the data in the graphics buffer content in a manner preventing extracting of the embedded data without knowledge of one or more aspects used to embed the data.

27. A device as recited in claim 24, the watermarking module being further configured to watermark the graphics buffer content by embedding the data identifying the program in portions of the graphics buffer content having higher entropy than other portions of the graphics buffer content.

28. A first device comprising:
an image acquisition module configured to obtain an image from which data embedded in a watermark is to be extracted, the image having been generated by watermarking, with data identifying a copy of a program running on a second device at a particular time, the content of a graphics buffer of the second device describing a screen display at the particular time; and
a data extraction module configured to analyze the obtained image and extract the data embedded in the watermark of the image.

29. A first device as recited in claim 28, the program comprising an operating system of the second device.

30. A first device as recited in claim 28, the data extraction module including knowledge of one or more aspects used to embed the data in the watermark, the knowledge of the one or more aspects including a pseudorandom number generator and seed value to select portions of the image used by the watermarking effective to identify the data embedded in the selected portions.

31. A first device as recited in claim 28, the data extraction module being further configured to identify the copy of the program that was running on the second device when a screen capture occurred.

* * * * *